United States Patent
Tutt et al.

(10) Patent No.: US 9,432,340 B1
(45) Date of Patent: Aug. 30, 2016

(54) SYSTEM AND METHOD FOR SECURE END-TO-END CHAT SYSTEM

(71) Applicant: Bogart Associates, Vienna, VA (US)

(72) Inventors: Timothy Tutt, Vienna, VA (US); John Richard Sherwood, Seattle, WA (US)

( * ) Notice: Subject to any disclaimer, the term of this patent is extended or adjusted under 35 U.S.C. 154(b) by 0 days.

(21) Appl. No.: 14/854,764

(22) Filed: Sep. 15, 2015

Related U.S. Application Data

(60) Provisional application No. 62/158,122, filed on May 7, 2015.

(51) Int. Cl.
*H04L 29/06* (2006.01)
*H04L 9/32* (2006.01)
*H04L 9/08* (2006.01)
*H04W 12/04* (2009.01)
*H04W 12/06* (2009.01)

(52) U.S. Cl.
CPC ......... *H04L 63/0428* (2013.01); *H04L 9/0861* (2013.01); *H04L 9/3271* (2013.01); *H04L 63/068* (2013.01); *H04L 63/168* (2013.01); *H04W 12/04* (2013.01); *H04W 12/06* (2013.01)

(58) Field of Classification Search
CPC ............. H04L 63/0428; H04L 63/068; H04L 63/168; H04L 9/3271; H04L 9/0861; H04L 63/04–63/0492; H04W 12/06; H04W 12/04
See application file for complete search history.

(56) References Cited

U.S. PATENT DOCUMENTS

| | | | | |
|---|---|---|---|---|
| 6,986,046 B1* | 1/2006 | Tuvell | ................. | G06F 21/6218 380/283 |
| 7,509,384 B1* | 3/2009 | Chen | ..................... | H04L 12/581 709/204 |
| 8,180,051 B1* | 5/2012 | O'Toole, Jr. | ......... | G06F 21/556 341/22 |
| 2005/0156708 A1* | 7/2005 | Puranik | ................ | H04L 63/062 340/7.21 |
| 2007/0003066 A1* | 1/2007 | Schwartz | ................ | G06F 21/31 380/286 |
| 2007/0073823 A1* | 3/2007 | Cohen | .................. | G06Q 10/107 709/207 |
| 2008/0034216 A1* | 2/2008 | Law | ...................... | H04L 9/3273 713/183 |
| 2008/0086317 A1* | 4/2008 | Jones | .................... | G06Q 50/265 705/325 |
| 2009/0185677 A1* | 7/2009 | Bugbee | ................. | H04L 9/0841 380/28 |
| 2010/0316219 A1* | 12/2010 | Boubion | ................ | G02B 21/16 380/259 |
| 2013/0073850 A1* | 3/2013 | Zaverucha | ........... | H04L 9/0869 713/168 |
| 2013/0275758 A1* | 10/2013 | Marlow | ................ | H04L 9/0841 713/171 |
| 2014/0208118 A1* | 7/2014 | Mayer | ................... | H04L 9/0825 713/171 |
| 2014/0281540 A1* | 9/2014 | Brouwer | ................... | H04L 9/12 713/169 |
| 2015/0067338 A1* | 3/2015 | Gero | ..................... | H04L 63/061 713/171 |
| 2015/0124961 A1* | 5/2015 | Lambert | ............... | H04L 9/0861 380/44 |
| 2015/0281185 A1* | 10/2015 | Cooley | ............... | H04L 63/0428 713/171 |
| 2015/0350247 A1* | 12/2015 | Adler | .................... | H04L 63/166 713/151 |

OTHER PUBLICATIONS

Alexander et al., "Improved User Authentication in Off-The-Record Messaging", Oct. 29, 2007, ACM, pp. 41-47.*
Raimondo et al., "Secure Off-the-Record Messaging", Nov. 7, 2005, ACM, pp. 81-89.*

* cited by examiner

*Primary Examiner* — Matthew Smithers
(74) *Attorney, Agent, or Firm* — Greenberg Traurig, LLP

(57) ABSTRACT

The present invention provides an efficient secure end-to-end messaging system utilizing encrypted ephemeral messages. The method comprises the steps of using a combination of HTTPS for transport security, using symmetric key cryptography with rotating temporary keys for individual message security, and using elliptic curve cryptography for key derivation and message authentication. The key rotation scheme used provides forward secrecy even between messages and perfect forward secrecy between sessions.

5 Claims, 2 Drawing Sheets

US 9,432,340 B1

SYSTEM AND METHOD FOR SECURE END-TO-END CHAT SYSTEM

CROSS-REFERENCE TO RELATED APPLICATION

This application claims the benefit of U.S. Provisional Application No. 62/158,122 filed May 7, 2015 the content of which is incorporated herein in its entirety by reference.

FIELD OF INVENTION

The present invention relates generally to a data processing system, method and computer program product and more specifically to a secure end-to-end remote chat system utilizing ephemeral messages.

BACKGROUND

Digital Messaging has typically operated in an unsecure environment. However, a growing number of people use digital messaging in the business environment to communicate with co-workers, and with people they do business with at other companies outside of company firewalls.

Off-the-Record Messaging ("OTR") is a cryptographic protocol that provides encryption for instant messaging conversations. OTR allows a user to have private conversations over instant messaging by providing encryption, authentication, and deniability. The messages sent do not have digital signatures that are checkable by a third party. Thus, anyone can forge messages after a conversation to make them look like they came from another.

OTR uses a combination of Advanced Encryption Standard ("AES") symmetric-key algorithms with 128 bits key length, the Diffie-Hellman key exchange with 1536 bits group size, and the SHA-1 hash function. Keys are not ephemeral (meaning the keys are persistent and remain in place), so messages are subject to cryptographic attacks which operate on large bodies of ciphertext encrypted with the same key. Furthermore, out of band communication is required and all ciphertext is stored on a central server for later access, leaving it open to ciphertext attacks should an attacker gain access.

Services that use a central server are vulnerable to attacks on the server, potentially compromising all communications. For example, while communications in Gmail are secured to and from the server (preventing eavesdroppers from reading contents), malicious insiders or hackers who gain access to Gmail itself can still exfiltrate the contents of conversations at will, regardless of this security while in transit.

It would be advantageous to provide a secure digital messaging system that lacks the problems described above.

SUMMARY

The present invention addresses the limitations described above and provides an efficient secure end-to-end messaging system utilizing encrypted ephemeral messages. The method comprises the steps of using a combination of HTTPS for transport security, using symmetric key cryptography with rotating temporary keys for individual message security, and using elliptic curve cryptography for key derivation and message authentication. The key rotation scheme used provides forward secrecy even between messages and perfect forward secrecy between sessions.

In all embodiments of the invention, additional steps are performed where all messages sent between clients are end-to-end encrypted, including key symmetric keys.

In a specific embodiment of the invention, each client generates a unique asymmetric key pair (public and private keys) based on Elliptic Curve Cryptography.

In this same embodiment of the invention, a user connects to ARC server 102 by sending a request over HTTPS with registration header sent. The requests include the server's pre-shared key, and the initial connection must include a registration header with a key signature and an initialization vector ("IVec").

In another embodiment of the invention, a user's initial key is the SHA-256 hash of their IVec concatenated with the shared key

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined by the claims.

DETAILED DESCRIPTION

This present invention provides a secure end-to-end chat system utilizing ephemeral messages. The anonymous secure end-to-end communications connection is established over a wireless or wired communications network or link. The applications are envisioned to be programmed in a high level language such as Java™, JavaScript, C++, C#, C, Visual Basic™, Swift, or Objective-C.

The system is built to provide an end-to-end secure communications framework with an additional focus on preventing surreptitious access.

In one embodiment, the present invention uses a combination of HTTPS for transport security, symmetric key cryptography with rotating temporary keys for individual message security, and elliptic curve cryptography for key derivation and message authentication. The key rotation scheme used in ARC is designed to provide forward secrecy even between messages.

Alternate embodiments utilize HTTP instead of HTTPS. It can be appreciated that this would be preferable in the case where a user is operating in a hostile cyberspace environment where HTTPS connections are heavily scrutinized or even banned. The user still benefits from the end-to-end security provided in the system as all encryption and decryption occurs on the client side and servers are only used for transport and authentication.

Figure 1:
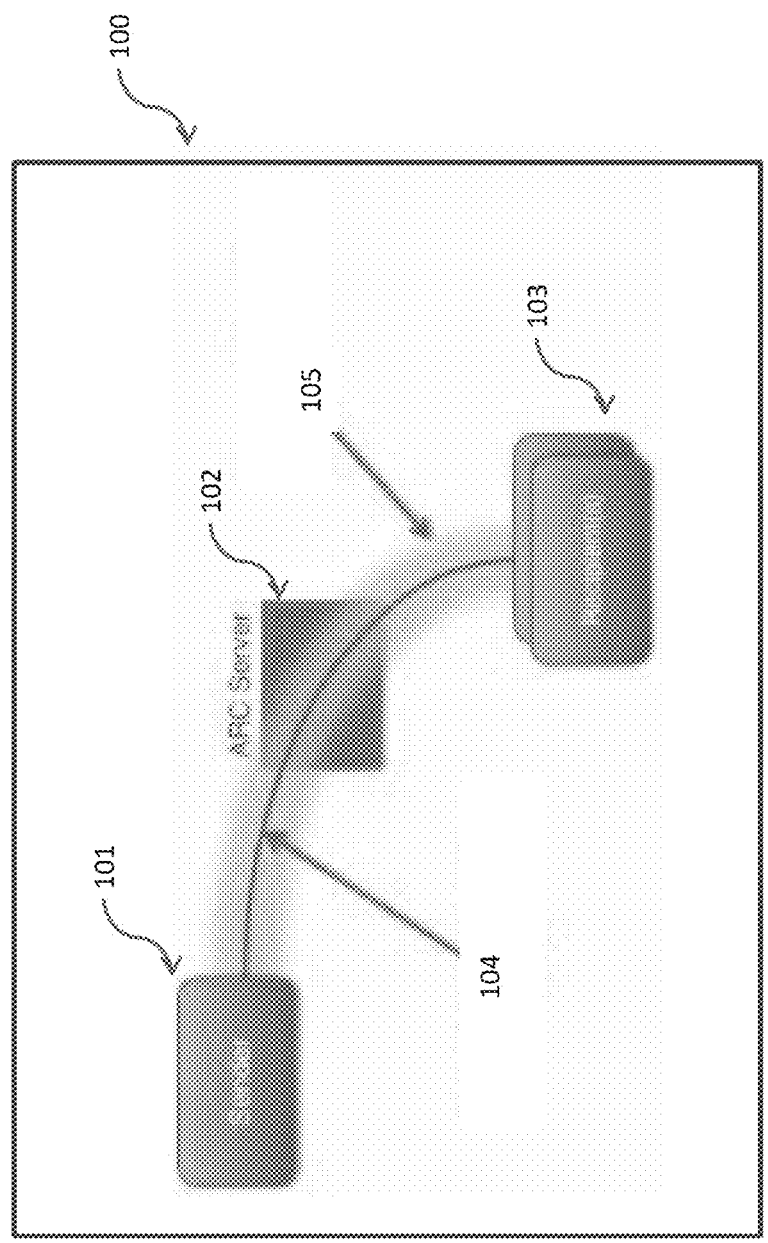
FIG. 1 illustrates a computing system 100 in accordance with one embodiment of the present invention.

FIG. 1 illustrates a computing system 100 in accordance with one embodiment of the present invention. The computing system 100 is shown to include a sender 101, an ARC server 102, and recipient(s) 103. The ARC server 102 is configured to support chat applications and other computer applications for carrying out the methods described herein.

In accordance with one exemplary embodiment, the ARC server 102 is configured to integrate other computer applications with messaging software such that messaging sessions deemed confidential as the messaging sessions are secured. Sender 101 and recipient 103 are ARC clients which use the server for a secured communication.

All messages sent between sender 101, recipient 103, and other ARC clients are end-to-end encrypted via end-to-end encryption layer 104. Transport security layer 105 can be implemented by HTTPS or another secure transport protocol. In one embodiment, each ARC client generates a unique asymmetric key pair (public and private keys) based on Elliptic Curve Diffie-Hellman key agreement protocols.

The encryption protocol for messages is designed to preempt various known cryptographic attacks. In one embodiment, the encryption protocol utilizes symmetric-key encryption, the AES algorithm is used, with 256 bit keys (AES-256).

All embodiments utilize what is called a 'rotating session key' for each message, used to ensure that no two messages are ever encrypted with the same key. It can be appreciated that this technique preempts various attacks such as known-plaintext and chosen-plaintext attacks. These attacks work by leveraging reused keys to weaken the cipher. Thus, by rotating encryption keys on every message, these attacks are preempted.

One embodiment utilizes time-skewed keys, where users hash the current time into a key signature. Due to the nature of hashing, this means that the key signature is dramatically different every time a new conversation takes place, and the signature cannot be used to correlate multiple conversations. It can be appreciated that this technique prevents an attacker who gains access to the server from correlating conversations occurring at different times to the same users.

Using a central ARC server 102 in FIG. 1, instead of direct peer-to-peer (P2P) communication, ensures simplicity of use and the ability to communicate regardless of network configurations. Central ARC server 102 remains secure even if an attacker reads and records every byte of data sent to and by the server. In addition to the obvious security benefit against attackers, this means that a server can be deployed in insecure locations or using untrusted services (for example, third party hosting or collocated services in a hostile territory) without risking security being compromised.

In one embodiment, ARC server 102 is able to conceal itself and its purpose by masquerading as a "run-of-the-mill" webserver, operating a decoy service. This functionality is implemented by having ARC server 102 function as a 'reverse proxy' unless specific conditions are met. Effectively, a user attempting to access ARC server 102 without special access permissions will end up transparently accessing another innocuous service. This is implemented by requiring users who intend to utilize ARC server 102 to pass a registration header with a pre-shared key specific to the server. Thus an outside user cannot determine that a server is actually running ARC server 102 without compromising it. While this is not necessary for the security of the system, it does ensure that the server does not draw excess attention from those seeking to compromise privileged data. It can also be appreciated that this allows monitoring of potential attackers by having them interact with the decoy system.

In one embodiment, a user connects to ARC server 102 by sending a request over HTTPS with registration header sent. The requests include the server's pre-shared key, and the initial connection must include a registration header with a key signature and an initialization vector (IVec). This joins the user to a channel where all users who send that same key signature will have their messages broadcasted in the channel.

For example, two users that send the key signature '0123456789' will be bound to the same channel, and any message sent by one user will be broadcast to the other. The user's IVec is used in conjunction with the pre-shared channel key to create the user's initial key. Ephemeral keys are generated for each session between a pair of users.

In the event that a user joins the channel after other users have already begun exchanging messages, they are nominally locked out of the conversation—the original users can read messages sent by the new users, but due to rotation, the new user cannot read messages sent by the original users in the channel. The original users can send 'resynchronization' messages, encrypted with their original keys, to allow the new user into the conversation.

Upon a user successfully registering, the server returns to the user a client ID, which the user must then include in future requests. This allows the server to keep track of which channel the user is in, in addition to allowing the user to 'pick up' messages that have been queued since the last polling request. In one embodiment, users then send encrypted messages in the body of HTTP POST requests until the conversation is over.

Thus each user generates a 64 bit IVec, which is sent to the server and thus considered 'public'. When a user connects, their IVec is broadcast to all other users, and they receive a list of users and the users' IVec values from the server in return. In this embodiment, the user's initial key is the SHA-256 hash of their IVec concatenated with the shared key. Then, each message sent includes an attribute with a new 64 bit value that is hashed with the prior key and used to generate the next key for the sending user.

Figure 2:
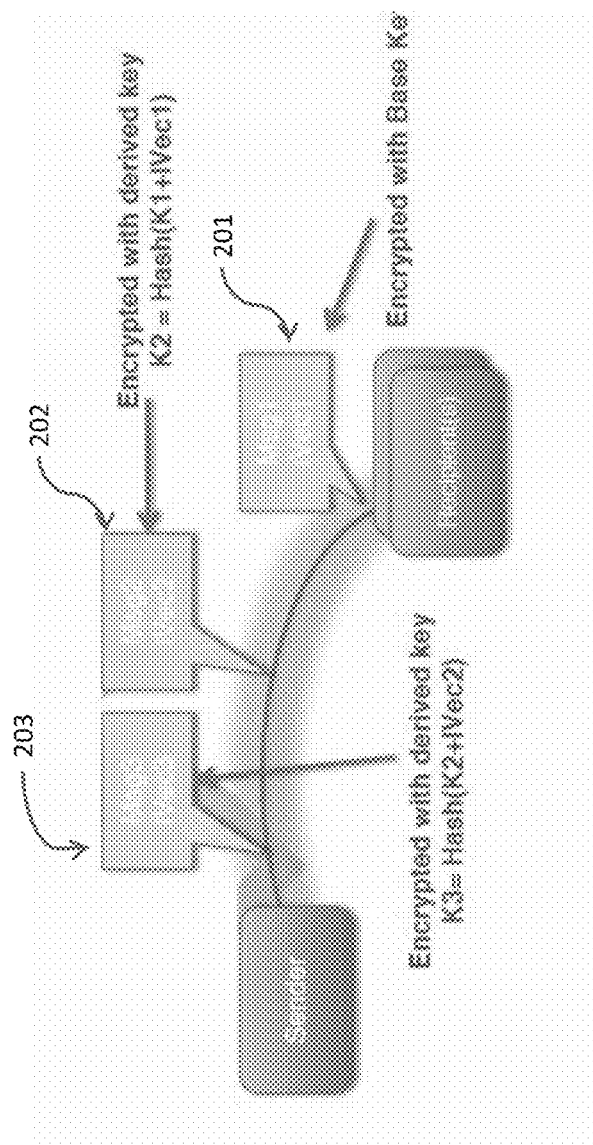
FIG. 2 illustrates a process of deriving the next key in sequence in accordance with one embodiment of the present invention.

In a separate embodiment, as shown in FIG. 2, during a session each client provides the initialization vector (IVec) as a part of the encrypted message payload, which will be concatenated with the previous key and then hashed to generate the next key in sequence. This ensures that all clients involved in the session can agree on the next key used for encryption and decryption. The first message, Msg1 201, is encrypted with the base key K1. Msg 2 202 is encrypted with derived key K2=Hash(K1+IVec1), which is the hash of the first key K1 concatenated with the first initialization vector IVec1. Msg3 203 is encrypted with derived key K3=Hash(K2+IVec2), which is the hash of the second key K2 concatenated with the second initialization vector IVec2.

In the same embodiment, each Client ID is associated with a license key. The Client ID that is provided to the server is a 36-byte value randomly generated by the client itself upon first use. The Client ID is stored in the encrypted local storage along with other configuration data for the ARC client.

ARC provides a secure administrative system for creating, revoking, and validating license keys. From within the management console, an administrator has the ability to generate new license keys; associate them with a unique identifier (preferably an e-mail address), set an expiration date for a license key, or revoke existing license keys or Client IDs. Unique identifiers and Client IDs are encrypted in the database. It can be appreciated that this provides a layer of protection in the case that an attacker gained access to the server and the database they would not be able to correlate client ids to specific users.

The ARC server has a mechanism for validating license keys when a client connects to the server. If the client is connecting to the server for the first time and the license key has not yet been associated with any Client ID, the client must send a special registration header along with the license key and Client ID to the server.

Once the server validates the license key an authentication challenge is sent to the client. The challenge contains a random 4-byte string selected by the server to which the client must respond. The server validates the response sent by the client that can be computed by an actual ARC client. If this validation fails, the server disconnects the client and revokes the license key and Client ID to prevent attempts at guessing a valid
response. This is known as a challenge response sequence.

After a user has authenticated an ARC client for the first time they are prompted to provide a local storage passphrase and generate keys. Once a user has selected a passphrase the following occurs:

The client selects a random private key and generates a corresponding public key over the Elliptic Curve (Curve25519).

The public and private key are securely stored in local storage, encrypted with AES-256 using the 256-bit encryption key derived from the user provided passphrase and the random salt using PBKDF2 with HMAC-SHA384 and 1000 iterations.

The public key is published to the server and associated with the unique client id associated with the user's client.

E-mail is sent to the e-mail address associated with the license key, which contains a link that must be clicked to verify the user of the client is in fact the intended user.

The client completes its registration once it receives a success token from the server.

Users of ARC clients have the ability to initiate sessions with other users by selecting a single user to begin a messaging session with and allow the client to generate an initial key by performing an Elliptic Curve Diffie-Helman key exchange using the public key of the receiver and the private key of the sender. Alternatively, a user can provide a passphrase of their choosing. Security requirements can be implemented (such as using at 4 character sets, uppercase letters, lowercase letters, numbers, and symbols with a length of at least 32 characters).

Once the passphrase has been generated, it is hashed and a 256-bit key is derived using the randomly generated salt and PBKDF2 with HMAC-SHA384 and 1000 iterations. The key is then encrypted using an Elliptic Curve Integrated Encryption Scheme (ECIES) and passed as a message to the receiving client. The receiving client decrypts this message to retrieve the initial key. One alternative embodiment uses the SHA-2 family of algorithms for hashing throughout the system. Specifically it uses SHA-256 for symmetric key generation SHA-384 for ECDSA. Additionally, ARC makes uses of the HMAC_DRBG using SHA-384 for random number generation throughout the application.

A current member of the session can invite a new user to the session providing the initial key and an IVec using ECIES and send a resynchronization message with the new IVec to the group for the new client to participate. Following this, the conversation reverts to rotating keys.

Any ARC client has the ability to request the public key of another ARC client. The client can make requests for the public key of other ARC clients by providing the hash of the unique identifier for a user (for example an e-mail address). In one embodiment, the server returns the public key, matching hash, raw unique identifier for visual verification, and a verification value of true or false. The verification value indicates whether or not the user of the ARC client associated with this public key has verified their identity by clicking the link provided in the e-mail received.

Configuration data for ARC clients are stored in a local SQLite Database with sensitive data encrypted with a key generated from the passphrase provided by the user during setup of the client. This SQLite database can be backed up and transferred to other devices for import into an ARC Client, but can only be restored if the user posses the correct passphrase. These backups cannot be restored any other way, loss of the passphrase used to encrypt the local storage will result in the inability to use the client or restore any configuration data or contacts.

Every time an ARC client connects to the ARC server (including the first connection), the client must provide a pre-shared server key. Upon first use the user of an ARC client must provide the following pieces of information:

1. The server's fully qualified domain name (FQDN) (If ARC is running behind a firewall an alias for the server may be used assuming it always resolves correctly).
2. The license key assigned to the user of this ARC Client. The license key must not have previously been used.
3. The base for the server's pre-shared key (PSK).

All of this data, once validated, is stored in the encrypted local storage of the ARC client. The base for the server's PSK is used to generate the current server key, which is needed for every message sent by the client to the server. The current server key is rotated on a timed basis at an interval set by the administrator. The typical recommendation is 5 minutes.

The server key rotation feature requires that the devices that all ARC clients associated with a particular installation are installed on and the server must be set to the same date/time. The key rotation happens based on UTC time to account for clients residing in varying time zones, but if the date on the device or server is set to an inaccurate value, the keys will not match and the client will not be able to connect to the server.

In addition to verifying the validity of an ARC client, the server also requires that the client connected can correctly provide a token generated based on a formula shared by the client and the server derived from the license key and a 4-byte challenge token provided by the server. This check ensures that the client connected is associated with a previously generated license key.

Throughout a given session, a number of messages will be sent between the client and server. Using the methods described in the Client-Server authentication section, the server continues to validate that the client is valid with every message sent whether it is a control message or a message for another client. Additionally, the server will issue challenges to the client at random intervals that the client must respond to. Failure to respond or response with an incorrect answer results in disconnection of the client with one exception.

Because the server's key is rotated on a time basis, there are edge cases in which a client and server may generate different keys once. In order to account for this, the server allows the server key to be checked a second time before disconnecting the client.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security token operating environment. Other variations and embodiments are possible in light of above teachings, and it is not intended that this Detailed Description limit the scope of invention, which is further defined and claimed below.

The invention claimed is:

1. A method of securely transferring data during a communications session, comprising:
- connecting to a communications server by sending a request over a communications protocol by providing a client id and a server key;
- validating the connection by a challenge response sequence;
- initiating a communications session by either randomly generating a symmetric key or generating a key based on a user provided passphrase;
- broadcasting an encrypted message to a set of communications participants comprising of a randomly generated salt used for calculating the next key for the session;
- inviting a new user to the session providing the initial key and an IVec using ECIES and sending a resynchronization message with the new IVec to the group for the new client to participate.

2. The method of claim 1, wherein the challenge response sequence further comprises a random 4-byte string challenge selected by the server to which the client must respond.

3. The method of claim 1, wherein the server continues to validate that the client is valid with every message sent.

4. The method of claim 1, wherein the server will issue challenges to the client at random intervals that the client must respond to.

5. The method of claim 1, wherein the communications device behaves as both a client and a server.

* * * * *